(12) United States Patent
Lee

(10) Patent No.: US 6,366,343 B1
(45) Date of Patent: Apr. 2, 2002

(54) SCANNING APPARATUS HAVING TWO TRANSMISSION SYSTEMS

(75) Inventor: Paul Lee, Taipei (TW)

(73) Assignee: Silitek Corporation, Taipei (TW)

( * ) Notice: Subject to any disclaimer, the term of this patent is extended or adjusted under 35 U.S.C. 154(b) by 0 days.

(21) Appl. No.: 09/655,938

(22) Filed: Sep. 6, 2000

(51) Int. Cl.$^7$ .................. G03B 27/10; G03B 27/58; H04N 1/04

(52) U.S. Cl. ................. 355/84; 355/72; 358/498

(58) Field of Search .................. 355/18, 40, 41, 355/72, 75, 84; 358/474, 496–498, 412; 271/10.04, 10.09

(56) References Cited

U.S. PATENT DOCUMENTS

| | | | |
|---|---|---|---|
| 4,931,834 A | * 6/1990 | Suga | 355/200 |
| 5,691,826 A | * 11/1997 | Yeh et al. | 358/498 |
| 5,854,696 A | * 12/1998 | Yun | 358/498 |
| 6,091,516 A | * 7/2000 | Chang et al. | 358/474 |

* cited by examiner

Primary Examiner—Russell Adams
Assistant Examiner—Hung Henry Nguyen
(74) Attorney, Agent, or Firm—Rabin & Berdo, P.C.

(57) ABSTRACT

A scanning apparatus having two transmission systems. The motor through a transmission gear-wheel with high gear-change rate and a transmission gear-wheel with a low gear-change rate transmits the motion of the carriage. One-way clutches are also used to select the transmission system and to control the direction of the carriage. Thus, the scanner has high image quality and short carriage backward time.

10 Claims, 5 Drawing Sheets

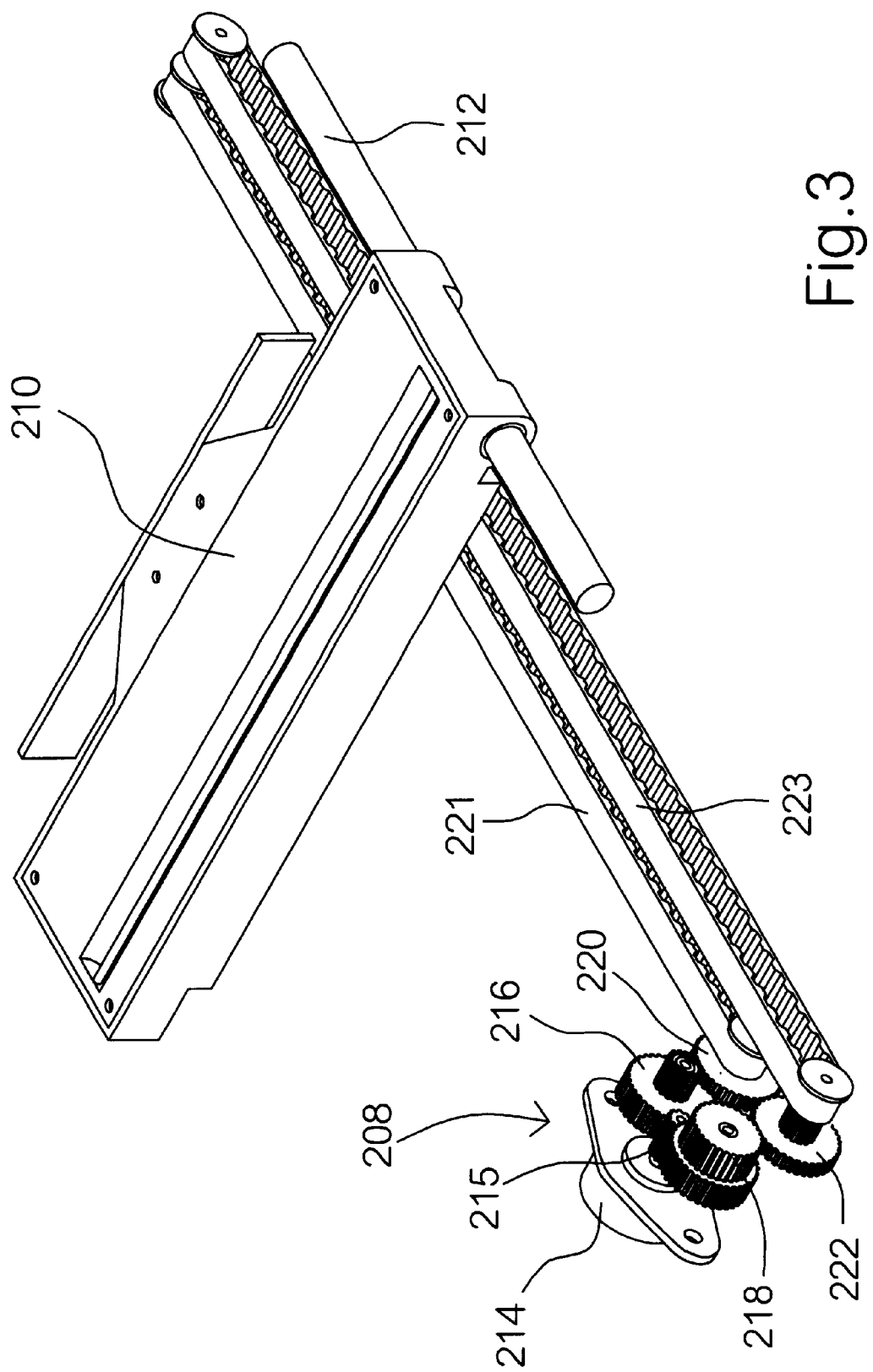

SCANNING APPARATUS HAVING TWO TRANSMISSION SYSTEMS

BACKGROUND OF THE INVENTION

This application incorporates by reference Taiwanese application Ser. No. 89116814, Filed Aug. 18, 2000.

1. Field of the Invention

The invention relates in general to a scanning apparatus having two transmission systems, and more particularly to a scanning apparatus capable of shortening the time for the carriage to move back to the start.

2. Description of the Related Art

Along with the continuous advance and progress of technology, the integration and application of multi-media is now an overpowering trend. Multi-media generally mean data in various format such as word, image, and voice. Therefore, multi-media apparatus for capturing image or voice come with the tide of fashion. Among that, image-scanning apparatus is one of the common image capturing apparatuses.

Referring to FIG. 1, a conventional flatbed scanning apparatus is illustrated. The conventional flatbed scanning apparatus includes a scanning platform 102 and a cover 104. Furthermore, as shown in FIG.2, there are an image capturing apparatus and a transmission system for transmitting the image capturing apparatus in the scanning platform 102.

The transmission system 106 transmits the carriage 108 to move forward and backward along the transmission guide way 110. The transmission system 106 includes a motor 112. The motor 112 is in conjunction with a transmission gear-wheel 114 and the transmission gear-wheel 114 is in conjunction with a high gear-change rate transmission gear-wheel (or gear set) 116. The motor 112 transmits the transmission gear wheel 114, the high gear-change rate transmission gear wheel 116 and the carriage 108 so that the carriage 108 can move along the transmission guide way 110 back and forth to scan the document 103 on the scan platform 102.

As high resolution of scanning apparatuses is required, gear sets with high gear-change rate are frequently used to meet the requirement. However, the applying of a high gear-change rate gear set lengthens the backward time of the carriage 108. A conventional way to solve the problem is by using higher rotating speed motors. The problems followed are high cost, temperature rising and noise.

SUMMARY OF THE INVENTION

It is therefore an object of the invention to provide an improved and simplified scanning apparatus with high image quality, short carriage backward time and high scanning efficiency simply by using one-way clutches to control the carriage's motion.

According to the object of the invention, a scanning apparatus having two transmission systems is provided. The scanning apparatus includes a motor, the first transmission gear-wheel and the second gear-wheel, a relatively high gear-change rate transmission gear-wheel and a relative low gear-change rate transmission gear-wheel, the first one-way clutch, the second one-way clutch and a carriage. The first transmission gear-wheel and the second transmission gear-wheel are transmitted by the motor. The relatively high gear-change rate transmission gear-wheel is in conjunction with the first transmission gear-wheel. The relatively low gear-change rate transmission gear-wheel is in conjunction with the second transmission gear-wheel. The first one-way clutch disposed inside the relatively high gear-change rate transmission gear-wheel to control the relatively high gear-change rate transmission gear-wheel to rotate in a first direction. The second one-way clutch disposed inside the relatively low gear-change rate transmission gear-wheel to control the relatively low gear-change rate transmission gear-wheel to rotate in a second direction. The carriage is transmitted by the relatively high gear-change rate transmission gear-wheel through the first transmission belt to move forward and also the carriage is transmitted by the relatively low gear-change rate transmission gear-wheel through the second transmission belt to move backward.

BRIEF DESCRIPTION OF THE DRAWINGS

Other objects, features, and advantages of the invention will become apparent from the following detailed description of the preferred but non-limiting embodiments. The description is made with reference to the accompanying drawings in which:

FIG. 3 is the three dimensional drawing of two transmission systems and the carriage according to a preferred embodiment of the invention.

DESCRIPTION OF THE PREFERRED EMBODIMENT

Figure 1:
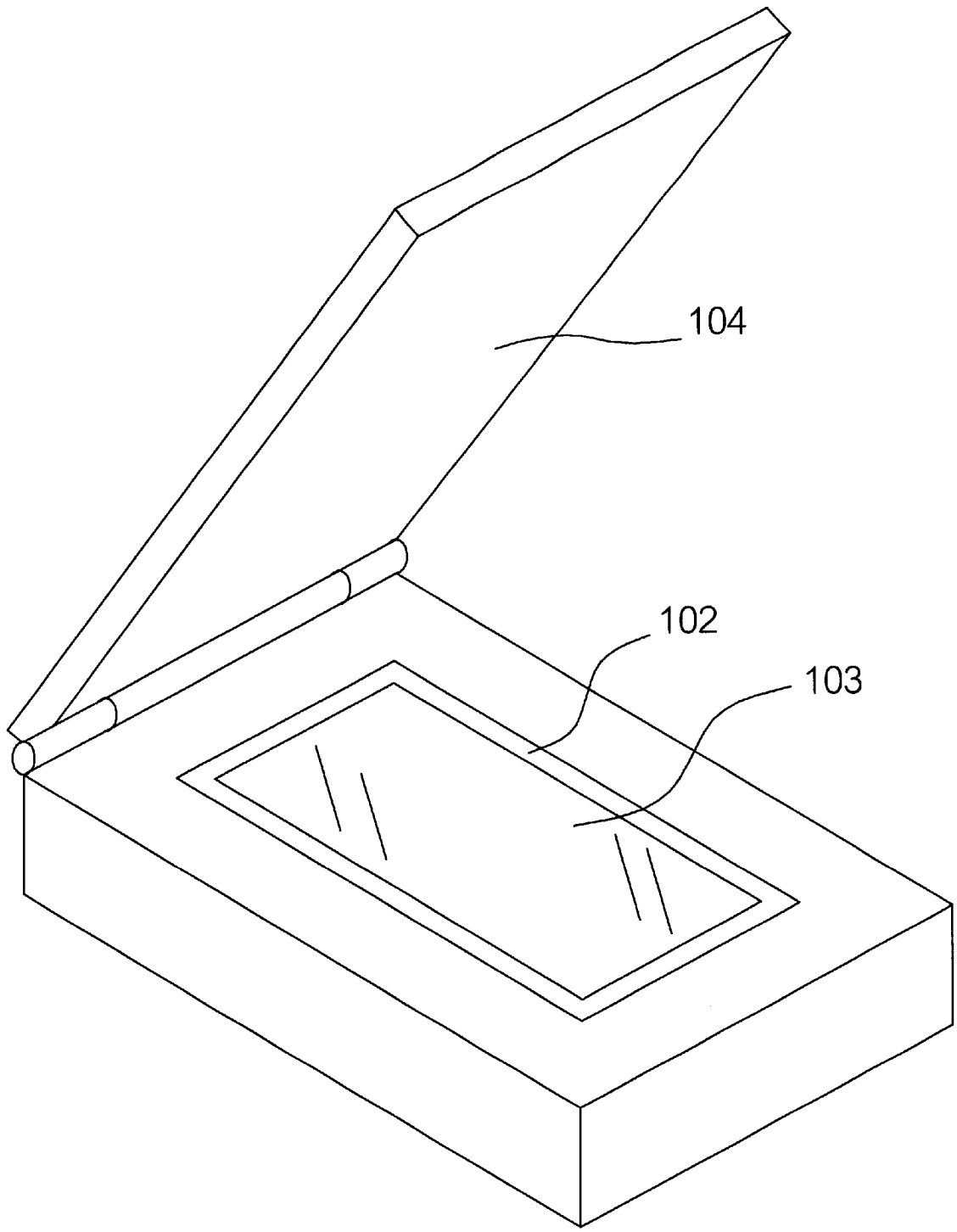
FIG. 1 (Prior Art) illustrates the appearance of a conventional flatbed scanning apparatus.
Figure 2:
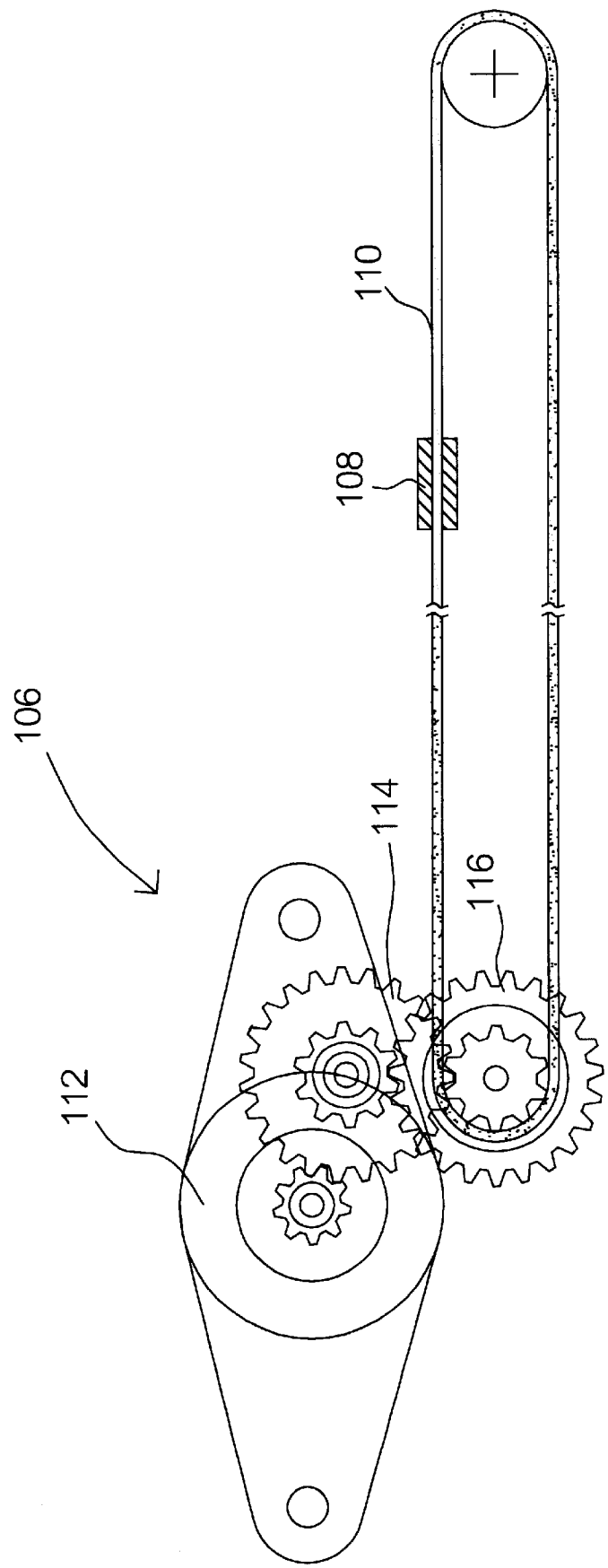
FIG. 2 (Prior Art) illustrates the interior of a conventional flatbed scanning apparatus.

FIG. 3 is the three dimensional drawing of two transmission systems and the carriage according to a preferred embodiment of the invention. The two transmission systems 208 and the carriage 210 are all mounted inside the scanner. The carriage 210 is transmitted by the two transmission systems 208 to move along the transmission guide way 212 back and forth.

The scanning apparatus according to a preferred embodiment of the invention includes a motor 214. The motor 214 and a gear-wheel 215 are connected by one shaft. The gear-wheel 215 is in conjunction with the first transmission gear-wheel 216 and also the second transmission gear-wheel 218. The first transmission gear-wheel 216 is further in conjunction with a transmission gear-wheel 220, which has high gear-change rate. The second transmission gear-wheel 218 is further in conjunction with a transmission gear-wheel 222, which has low gear-change rate.

The motor 214 transmits the first transmission gear-wheel 216 and the second transmission gear-wheel 218 and successively transmits the gear-wheel 220 with high gear-change rate and the gear-wheel 222 with low gear-change rate, which are in conjunction with the first transmission gear-wheel 216 and the second transmission gear-wheel 218, respectively. Through a transmission belt 221 and a transmission belt 223, the carriage 210 is transmitted to move back and forth along the transmission guide way 212.

Figure 4A:
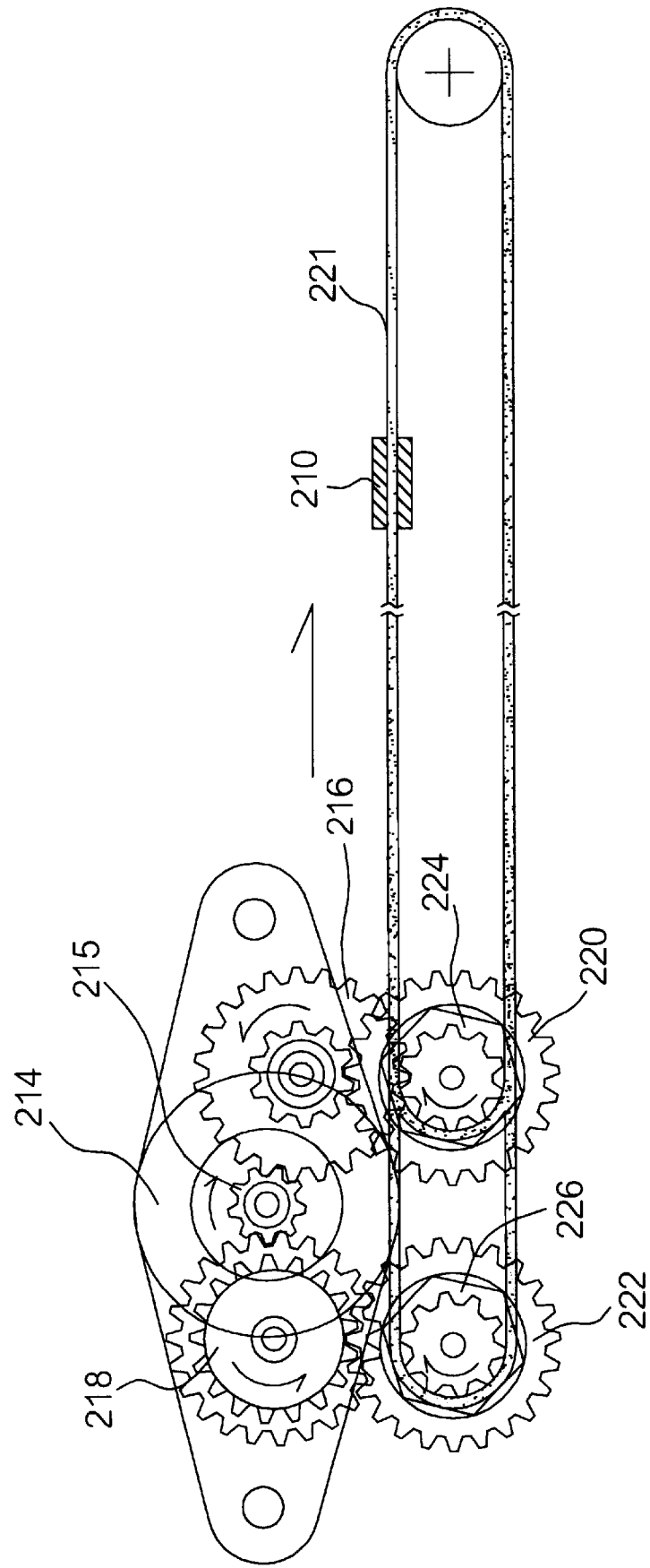
FIG. 4A is the cross-sectional view of the two transmission systems and the carriage according to a preferred embodiment of the invention, while the carriage is moving forward.

FIG. 4A is the cross-sectional view of the two transmission systems and the carriage according to a preferred embodiment of the invention, while the carriage is moving forward. A clockwise one-way clutch 224 is disposed at the high gear-change rate transmission gear-wheel 220 and a counterclockwise one-way clutch 226 is disposed at the low gear-change rate transmission gear-wheel 222. The forward motion and backward motion of the carriage 210 can be controlled by the two transmission systems. The high gear-change rate transmission gear-wheel 220 transmits the carriage 210 to move forward and the low gear-change rate transmission gear-wheel 222 transmits the carriage 210 to move backward. Preferably, the gear-change rate of the transmission gear-wheel 220 to the motor 214 can be, for example, 25/216. The gear-change rate of the transmission gear-wheel 222 to the motor 214 can be, for example, 50/216. Because the high gear-change rate transmission gear-wheel 220 and the low gear-change rate transmission gear-wheel 222 are driven by the same motor 214, the speed of the high gear-change rate transmission gear-wheel 220 is only about ½ of the speed of the low gear-change rate transmission gear-wheel 222. However, the gear-change rate of the transmission gear-wheel 220 to the motor 214 and the gear-change rate of the transmission gear-wheel 222 to the motor 214 are not limited to the examples taken herein. Also, the gear-change ratio and the forward/backward speed of the carriage can be modified when necessary.

FIG. 4A illustrates the action of the transmission systems while the carriage 210 is forwarded. While the motor 214 rotates clockwise, the first transmission gear-wheel 216 and the second transmission gear-wheel 218, which are in conjunction with the motor 214, rotates counterclockwise. Consequently, the high gear-change ratio transmission gear-wheel 220 and the low gear-change ratio transmission gear-wheel 222 in conjunction respectively with the first transmission gear-wheel 216 and the second transmission gear-wheel 218 rotates clockwise. As a result, the counterclockwise one-way clutch 226 idles in the clockwise direction; and the clockwise rotation of the high gear-change rate transmission gear 220 is transmitted to the counterclockwise one-way clutch 224, which thus initiates the carriage 210 to move forward along the transmission guide way 212. High quality image can be obtained while the carriage 210 is driven by the high gear-change rate transmission gear-wheel 220.

Figure 4B:
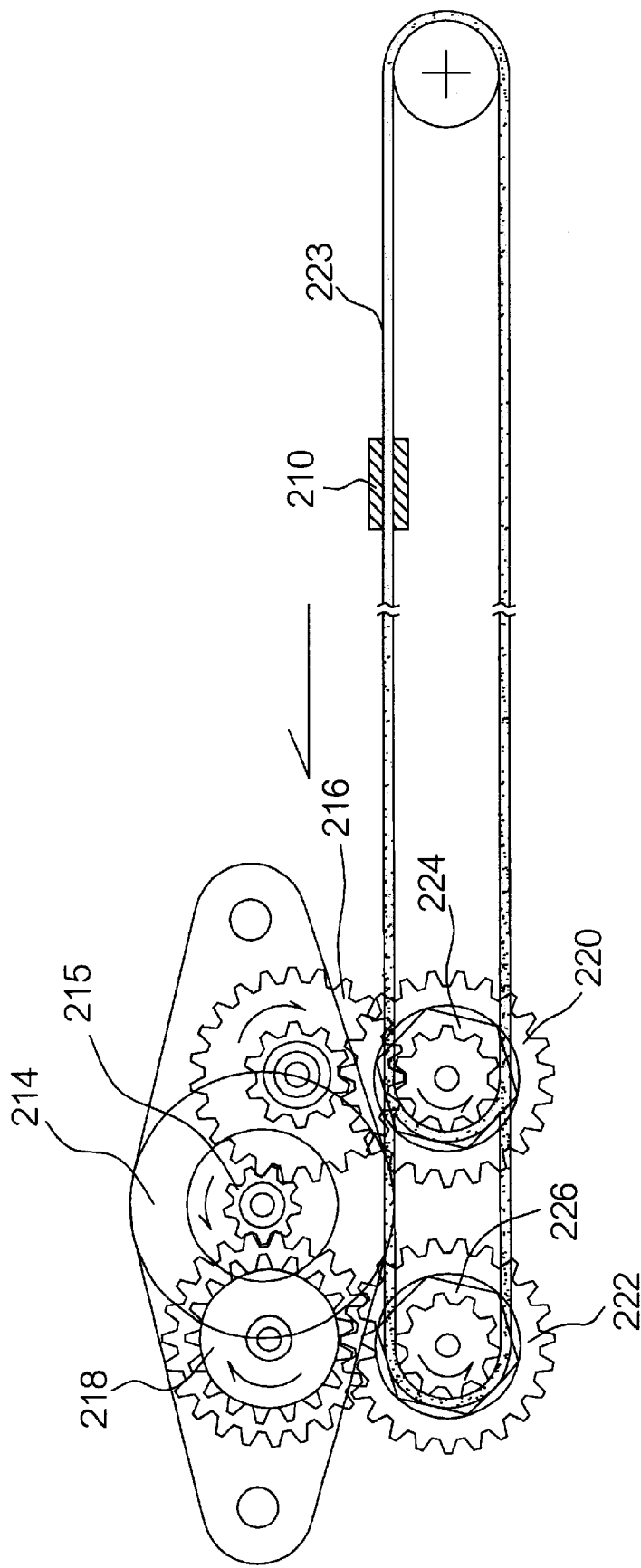
FIG. 4B illustrates the action of the transmission systems while the carriage is moving backward.

FIG. 4B illustrates the action of the transmission systems while the carriage 210 is moving backward. While the motor 214 rotates counterclockwise, the first transmission gear-wheel 216 and the second transmission gear-wheel 218, which are in conjunction with the motor 214, rotates clockwise. Consequently, the high gear-change ratio transmission gear-wheel 220 and the low gear-change ratio transmission gear-wheel 222 in conjunction respectively with the first transmission gear-wheel 216 and the second transmission gear-wheel 218 rotates counterclockwise. As a result, the clockwise one-way clutch 224 idles in the counterclockwise direction; and the counterclockwise rotation of the low gear-change rate transmission gear 222 is transmitted to the counterclockwise one-way clutch 226, which thus initiates the carriage 210 to move backward along the transmission guide way 212. The time for the carriage 210 to move back to the initial point can be therefore shortened.

Therefore, according to the preferred embodiment of the invention, the scanner having two transmission systems that use the simple design employing the one-way clutches to control the transmission of the carriage has high image quality and short carriage backward time.

While the invention has been described by way of example and in terms of the preferred embodiment, it is to be understood that the invention is not limited to the disclosed embodiment. For example, according to a preferred embodiment of the invention, the motion of the carriage is driven by the motor and transmitted by the first/second transmission gear-wheel and the high/low gear-change rate transmission gear-wheel. However, it is clear for people skilled in this art that several other gear-wheel sets can be used instead of the first/second transmission gear-wheel and the high/low gear-change rate transmission gear-wheel. Any modification having one-way clutches at the first gear-wheel and the second gear-wheel to respectively control the forward motion and the backward motion of the carriage and thus having the advantages of short backward time and high image quality is within the scope of the invention. This invention is intended to cover various modifications and similar arrangements and procedures, and the scope of the appended claims therefore should be accorded the broadest interpretation so as to encompass all such modifications and similar arrangements and procedures.

What is claimed is:

1. A scanning apparatus having two transmission systems, wherein the scanning apparatus comprising:
   a motor;
   a first transmission gear-wheel and a second transmission gear-wheel, wherein the first transmission gear-wheel and the second transmission gear-wheel are respectively transmitted by the motor;
   a relatively high gear-change rate transmission gear-wheel in conjunction with the first transmission gear-wheel;
   a relatively low gear-change rate transmission gear-wheel in conjunction with the second transmission gear-wheel;
   a first one-way clutch disposed inside the relatively high gear-change rate transmission gear-wheel to control the relatively high gear-change rate transmission gear-wheel to rotate in a first direction;
   a second one-way clutch disposed inside the relatively low gear-change rate transmission gear-wheel to control the relatively low gear-change rate transmission gear-wheel to rotate in a second direction; and
   a carriage, wherein the carriage is transmitted by the relatively high gear-change rate transmission gear-wheel through a first transmission belt to move forward and also the carriage is transmitted by the relatively low gear-change rate transmission gear-wheel through a second transmission belt to move backward.

2. The scanning apparatus as claimed in claim 1, wherein the first direction is clockwise and the second direction is counterclockwise.

3. The scanning apparatus as claimed in claim 2, wherein the first one-way clutch is a clockwise one-way clutch and the second one-way clutch is a counterclockwise one-way clutch.

4. A scanning apparatus having two transmission systems, wherein the scanning apparatus comprising:
   a motor;
   a gear-wheel set, which is transmitted by the motor;
   a first one-way clutch disposed inside a first gear-wheel of the gear-wheel set to control the first gear-wheel to rotate in a first direction;
   a second one-way clutch disposed inside a second gear-wheel of the gear-wheel set to control the second gear-wheel to rotate in a second direction; and
   a carriage, wherein the carriage is transmitted by a third gear-wheel of the gear-wheel set through a first transmission belt to move forward and also the carriage is transmitted by a fourth gear-wheel of the gear-wheel set through a second transmission belt to move backward.

5. The scanning apparatus as claimed in claim 4, wherein the backward speed of the carriage is higher than the forward speed of the carriage.

6. The scanning apparatus as claimed in claim 5, wherein the carriage scans a document while the carriage moves forward.

7. The scanning apparatus as claimed in claim 4, wherein the first direction is clockwise.

8. The scanning apparatus as claimed in claim 4, wherein the first direction is counterclockwise.

9. The scanning apparatus as claimed in claim 4, wherein the second direction is clockwise.

10. The scanning apparatus as claimed in claim 4, wherein the second direction is counterclockwise.

* * * * *